United States Patent [19]

Schnell et al.

[11] 4,285,128

[45] Aug. 25, 1981

[54] SPOOL FEED MECHANISM FOR LINE FED GRASS TRIMMER

[75] Inventors: John W. Schnell; Max K. Haenel, both of Columbia, Mo.

[73] Assignee: Benchmark Tool Company, Vandalia, Ohio

[21] Appl. No.: 95,604

[22] Filed: Nov. 16, 1979

[51] Int. Cl.³ ............................................ A01D 50/00
[52] U.S. Cl. ...................................... 30/276; 56/12.7; 56/295
[58] Field of Search .................... 30/276, 347; 56/12.7, 56/295

[56] References Cited

U.S. PATENT DOCUMENTS

| | | |
|---|---|---|
| 4,091,536 | 5/1978 | Bartholomew ........................ 30/276 |
| 4,118,864 | 10/1978 | Pittinger et al. ....................... 30/276 |
| 4,131,997 | 1/1979 | Utter ..................................... 30/276 |
| 4,136,446 | 1/1979 | Tripp .................................... 30/276 |
| 4,183,138 | 1/1980 | Mitchell ................................ 30/276 |
| 4,189,833 | 2/1980 | Kwater ................................. 30/276 |
| 4,211,004 | 7/1980 | Woods .................................. 30/276 |

Primary Examiner—Jimmy C. Peters
Attorney, Agent, or Firm—Biebel, French & Nauman

[57] ABSTRACT

A spool feed mechanism for a non-metallic, line grass trimmer wherein the free end of the cutting line is spun at high speed for cutting vegetation, includes a spool of cutting line mounted for rotation about the central axis thereof. The spool has first and second ratchet wheels located at respective ends. Each ratchet wheel includes a set of ratchet teeth, one set of which is angularly displaced with respect to the other. A U-shaped, resilient member having first and second pawls provided on the legs thereof is mounted adjacent the spool with the pawls positioned for alternate engagement and disengagement of the respective ratchet wheels. A manually operated trigger assembly coupled to the member moves the latter from a normal position to disengage the first pawl and ratchet wheel and to engage the second pawl and ratchet wheel, whereby the spool is permitted to rotate incrementally to feed a predetermined length of cutting line. Movement of the member back to the normal position feeds out a second predetermined length of line. A force applied at the center of the resilient member disengages both pawls and respective ratchet wheels to permit free rotation of the spool to load a fresh spool of cutting line.

10 Claims, 7 Drawing Figures

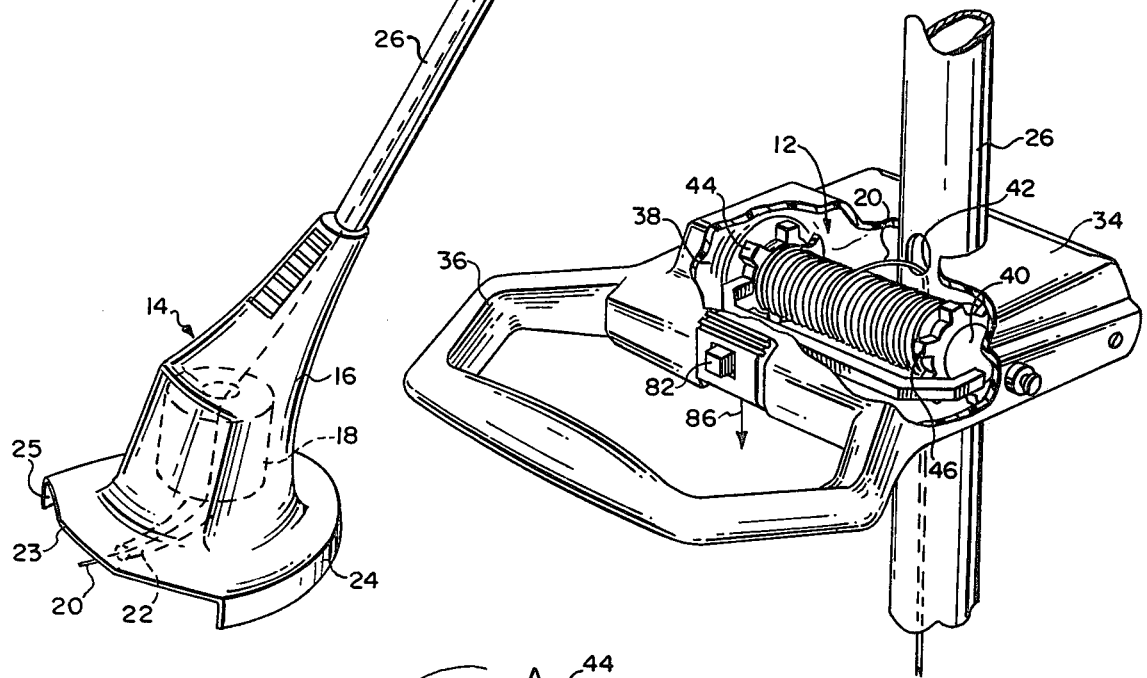
FIG. 1
FIG. 2
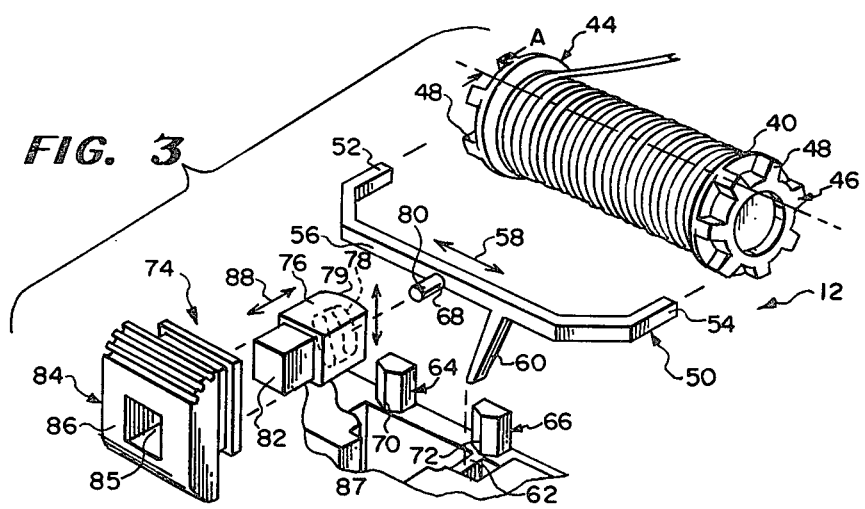
FIG. 3

SPOOL FEED MECHANISM FOR LINE FED GRASS TRIMMER

BACKGROUND OF THE INVENTION

This invention relates generally to non-metallic, spool fed line, grass trimmers and more particularly to a spool feed mechanism for such grass trimmers.

A variety of arrangements have been employed in prior art grass trimmers for feeding nylon or the like non-metallic line used for cutting vegatation, incrementally from a spool on which the line is stored. In these prior art arrangements, some type of mechanism is employed which releases the spool for rotation, causing an incremental feeding of the cutting line therefrom. Examples of such spool feed mechanisms are described in U.S. Pat. Nos. 4,118,864; 4,131,997; and 4,136,446.

In the case of the U.S. Pat. No. 4,118,864, a grass trimmer is disclosed wherein lengths of nylon or the like line are fed from two spools through the rotating drive shaft of an electric drive motor of the grass trimmer and out channels defined in the cutting head attached thereto. Centrifugal rotation of the cutting head and shaft pulls the line from two geared spools which cooperate with a worm pinion gear. Rotation of the assembly moves the pinion gear upwardly on a shaft. The release of a brake permits the pinion to travel back down the shaft, driving the geared spools to play out an increment of cutting line from each spool.

The U.S. Pat. No. 4,131,997 discloses a spool fed nylon cord grass trimmer employing rocker arms which cooperate with detents in the spool end to incrementally rotate the spool, thereby feeding out predetermined lengths of vegetation cutting line. The U.S. Pat. No. 4,136,446 shows an automatic, incremental line feed mechanism for a nylon line trimmer which employs an escapement mechanism cooperating with a radially ribbed spool to feed lengths of line therefrom.

In all of the arrangements of the last-mentioned art patents, the spool of line and release mechanism is carried on the cutting head of the grass trimmer. Release of the spool by operation of the release mechanism permits rotation of the spool relative to the trimmer head.

While the spool feed arrangements of the prior art operate satisfactorily for the most part to dispense incremental lengths of cutting line for cutting vegetation, changing of the spool necessitates either lifting the trimmer to a level whereat an operator can easily make the spool substitution or the operator must bend down to ground level to accomplish the latter. Furthermore, some mechanical connection or engagement with the feed mechanism must be made so that an operator can actuate the mechanism to feed lengths of cutting line therefrom during the operation of the trimmer without bending down to the trimmer head each time an additional length of cutting line is required.

SUMMARY OF THE INVENTION

Accordingly, it is a primary object of the present invention to provide a new and improved spool feed mechanism for use in a nylon or the like line grass trimmer which overcomes the drawbacks associated with prior art spool feed mechanisms described.

It is another object of the present invention to provide a new and improved spool feed mechanism for a line grass trimmer which is of simple construction, easy to use and which operates efficiently to incrementally feed a length of line to the cutting head of a grass trimmer and permits easy changing of spools of cutting line as required in the trimmer.

It is still another object of the present invention to provide a new and improved, spool fed, non-metallic line grass trimmer in which the spool of cutting line and feed mechanism therefor are separated from the cutting head.

Briefly, a preferred embodiment of the spool feed mechanism for a line grass trimmer includes a housing mounted on the hollow support shaft of the trimmer, spaced from the trimmer cutting head and located near the handle end thereof. The spool housing includes a compartment for receipt of a spool of nylon or the like non-metallic cutting line. The compartment communicates with the hollow shaft via an aperture in th side wall of the shaft. The shaft communicates with the hollow drive shaft of an electric motor located in the trimmer cutting head, the motor being employed for spinning the free end of the line to cut vegetation.

The spool includes ratchet wheels mounted at opposite ends thereof, the radial teeth of one ratchet wheel being angularly displaced about the axis of the spool or out of phase with respect to the teeth of the other ratchet wheel.

A resilient u-shaped beam having first and second pawls on the legs thereof is mounted adjacent the spool, with the bight of the beam extending generally parallel to the axis of rotation of the spool. The beam is movable along a path parallel to the axis of rotation of the spool to cause engagement of one or the other of the pawls with the teeth of a corresponding ratchet wheel of the spool. The beam is biased in a first direction whereat a first pawl of the beam engages the teeth of a first ratchet wheel. Movement of the beam in a second direction disengages the first pawl and corresponding ratchet wheel, permitting the spool to rotate incrementally, feeding a first length of cutting line therefrom. Rotation of the spool is discontinued due to the engagement of the second pawl with the teeth of a corresponding ratchet wheel. Release of the beam permits it to be returned to its initial position and the spool rotates incrementally again to feed a second length of line therefrom.

The spinning of the free end of the cutting line by the trimmer drive motor provides the force necessary to pull line from the spool, rotating the latter when released by the pawl and ratchet wheel arrangement as described. A knife edge can be provided on the trimmer housing to sever the cutting line as it is fed from the spool to properly size the line portion used for cutting vegetation.

When a new spool of line is required, the resilient beam is engaged at the center thereof, and thereby deflected to separate both pawls simultaneously from respective ratchet wheels whereby the spool is permitted to rotate freely. The motor is deactivated and the new line is fed manually into the hollow support shaft of the trimmer and into the hollow drive shaft of the motor. Once the new line has been threaded properly, the beam is released and normal operation of the trimmer is continued.

DESCRIPTION OF THE DRAWINGS

In the Drawings

FIG. 1 is a perspective view of a spool fed, non-metallic line grass trimmer including the spool feed mechanism according to the invention;

FIG. 2 is an enlarged, fragmentary view of the spool feed mechanism of the grass trimmer of FIG. 1;

FIG. 3 is an exploded view of the spool feed mechanism of FIG. 2;

DETAILED DESCRIPTION OF THE DRAWINGS

Figure 4:
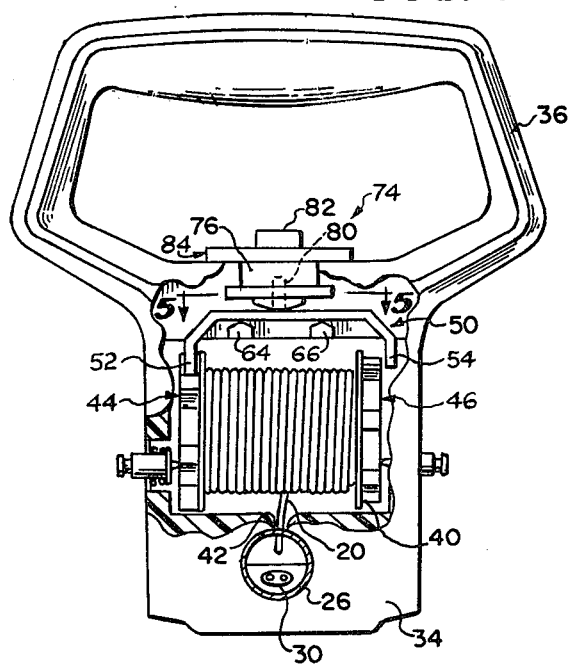
FIGS. 4 and 4a are partially fragmented, plan views of the spool feed mechanism of FIG. 2, illustrating the operation thereof in loading a fresh spool of line for the trimmer.

Referring now to the drawings in greater detail wherein like numerals have been employed throughout the various views to designate similar components, there is illustrated in FIG. 1, a spool fed, non-metallic line, grass trimmer 10 including a spool feed mechanism 12 according to the invention. The grass trimmer 10 comprises a cutting head designated generally by the numeral 14, including an outer housing 16 in which an electrically operated drive motor 18 is mounted for spinning the free end of a length of nylon or the like cutting line 20 fed thereto from a spool of non-metallic cutting line 40 by means of spool feed mechanism 12. In the case of grass trimmer 10 shown, motor 18 includes a hollow drive shaft through which the free end of the cutting line is fed. A hollow, curved guide tube or the like 22 mounted on the motor drive shaft for rotation therewith, channels the line radially outwardly of the housing 16 to be spun at high speed for cutting vegetation. The line end extends outwardly from the housing from the front end 23 thereof so that grass and other vegetation is cut ahead of an operator. A rim 24 on the rear of the housing prevents cut vegetation from being expelled toward the operator. A stationary cutting blade 25 mounted on housing 16 in the path of the spinning line end, severs line fed to the cutting head to a predetermined length, thereby providing a fresh line end for cutting vegetation.

The trimmer cutting head housing 16 is joined via a hollow support shaft 26 to a handle 28 of the trimmer. An electric cord 30 extends into handle 28 through a switch (not shown) mounted therein, operated by trigger 32. The electrical cord continues on through hollow shaft 26 and into housing 16 whereat it is connected to the electric drive motor. Electric power to the motor is provided via cord 30.

Mounted on support shaft 26 near handle 28 is the spool feed mechanism housing 34. The last mentioned housing includes a handle grip 36 to support the trimmer in two handed operation as well as a compartment 38 for receiving a spool 40 of cutting line.

Spool 40 is mounted for rotation about the central axis thereof, in housing compartment 38. The axis of rotation of the spool is mounted perpendicular to the support shaft 26 so that cutting line 20 can be fed directly from the spool into an aperture 42 defined in the sidewall of shaft 26 (FIG. 2) adjacent the compartment.

Spool 40 as can be seen in the figures of the drawings includes indexing means comprising ratchet wheels 44, 46, at opposite ends thereof. Each of the wheels includes a set of an equal number of radially extending, circumferentially spaced teeth such as 48. The radially extending teeth of wheel 44 are angularly displaced or offset with respect to the teeth of wheel 46. Such relative angular displacement is identified in FIG. 3 of the drawings by the distance "A". The purpose of the latter will be discussed hereinafter.

With the spool 40 mounted in compartment 38 as described, cutting line is fed into aperture 42 in the side wall of the suport shaft, down the shaft, through the drive shaft of motor 18 and out curved feed tube 22.

Feeding line from the spool 40 when a new cutting end is required is accomplished through the movement of a resilient operating beam 50 mounted adjacent spool 40 in housing 34. Beam 50, shown best in FIG. 3, is generally u-shaped and fabricated of resilient plastic or similar material. Beam 50 includes first and second indexing engagement means comprising pawls 52, 54, forming the legs of the U.

The beam is positioned in housing 34 with pawls 52, 54 extending substantially radially with respect to the axis of rotation of spool 40, in cooperating relation with ratchet wheels 44, 46, respectively. Beam 50 is mounted for movement axially of spool 40 in the direction of extension of the bight 56 of the beam, as indicated by arrows 58 (FIG. 3).

An integrally formed resilient biasing spring 60 extends from beam 50 and is received in an aperture 62 defined in housing 34 for engagement with a wall portion at the side of the aperture. Engagement of spring 60 with the housing wall imparts a biasing force to beam 50 in a first direction toward the end of the spool including ratchet wheel 46, as illustrated in the drawings. In such position pawl 52 of beam 50 is normally maintained in engagement with the teeth of ratchet wheel 44. Movement of beam 50 in the direction of ratchet wheel 44 disengages pawl 52 and ratchet wheel 44 and causes pawl 54 and ratchet wheel 46 to become engaged, thereby to limit the rotation of spool 40 to the angular distance "A" defined between the offset radially extending teeth of ratchet wheels 44, 46. Release of beam 50 permits resilient spring 60 to return the beam to its initial position, disengaging pawl 54 and ratchet wheel 46 and re-engaging pawl 52 and ratchet wheel 44, permitting the spool to again be rotated incrementally.

Figure 4A:
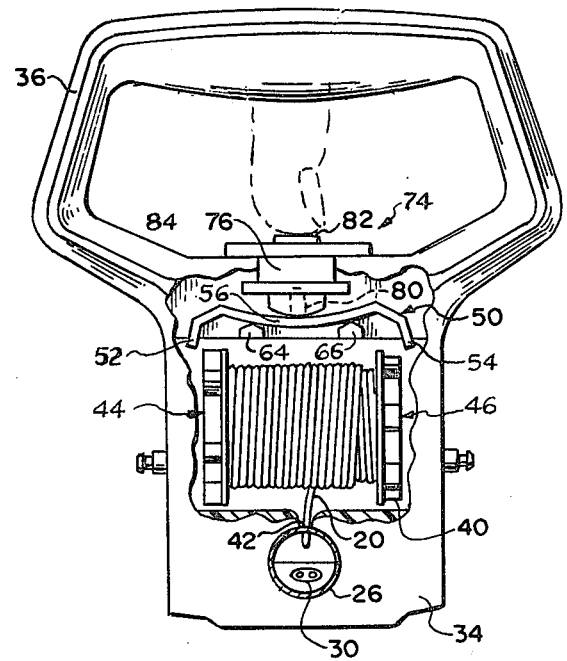

When mounted in housing 34, bight portion 56 of beam 50 rests on spaced support blocks 64, 66 for slidable movement with respect thereto the blocks are positioned on opposite sides of the central point 68 of the bight of beam 50 and each block has a raised center portion 70, 72, respectively, whereby the blocks make line contact with the beam across the direction of movement thereof. Depression of the beam at the center point 68, against blocks 64, 66, causes the beam to bend as illustrated in FIG. 4a, producing the simultaneous disengagement of pawls 52, 54 and respective ratchet wheels 44, 46, permitting free rotation of spool 40.

Figure 5:
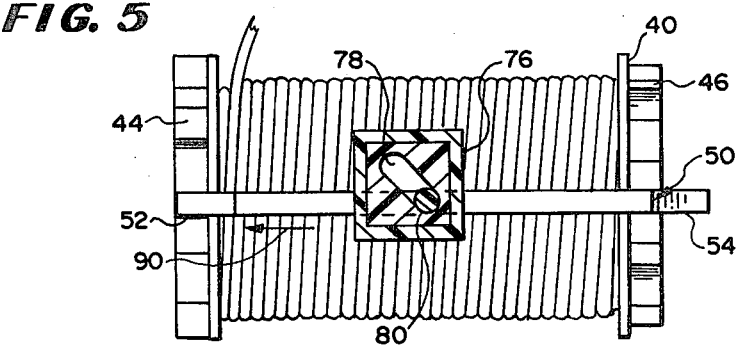
FIGS. 5 and 5a are enlarged sectional views of the spool feed mechanism of FIG. 4 taken along the line 5—5, illustrating the operation thereof to incrementally feed a length of cutting line therefrom.
Figure 5A:
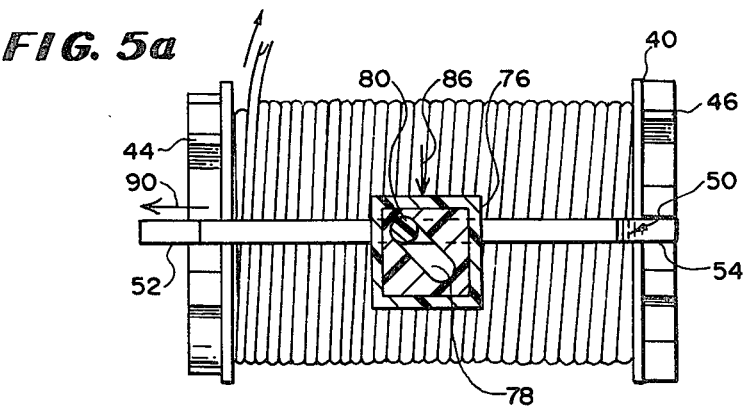

An operating trigger assembly 74 illustrated in FIG. 3 is included as a part of the spool feed mechanism 12 to control the movement of beam 50 and the feeding of line from spool 40. Assembly 74 includes a first block 76 having a diagonal slot 78 formed in one end 79 thereof for receipt of a pin 80 integrally formed with beam 50 and extending from the central point of the bight portion thereof in a direction opposite from the extension of pawls 52, 54 of the beam. A narrowed, opposite end 82 of block 76 extends outwardly from beam 50 and is received in and extends through an aperture 85 defined in a second block 84. The joined blocks are mounted in a specially shaped aperture 87 defined in housing 34, for slidable movement as a unit in the direction of arrow 86 (FIGS. 2, 5a). Movement of the pair of blocks in the direction of arrow 86 causes beam 50 to be moved against biasing member 60 from a normal position, whereat pawl 52 and ratchet wheel 44 are engaged to a second position whereat pawl 54 and ratchet wheel 46 are engaged. Release of the blocks permits biasing member 60 to return the beam and blocks to their original positions (see FIGS. 5, 5a).

Use of the spool feed mechanism 12 is made while operating the grass trimmer 10 since it is the centrifugal force created by the spinning end of line 20 wich produces rotation of spool 40. To feed a new section or length of line to cutting head 14 of the trimmer from spool 40, the operator need only move block 84 of the trigger assembly in the direction of arrow 86. The latter moves beam 50 from the position shown in FIG. 5 in the direction of arrow 90 to the position shown in FIG. 5a. The last mentioned movement disengages pawl 52 and ratchet wheel 44, permitting the centrifugal force created by the spinning end of line 20, to pull on spool 40, causing it to rotate distance "A". With the beam in the position shown in FIG. 5a, pawl 54 is placed in the path of the rotating ratchet wheel 46 to engage one of the teeth thereof, which as explained heretofore are angularly out of phase or offset with respect to the teeth of ratchet wheel 44. Thus spool 40 is permitted to rotate only incrementally. Release of block 84, permits beam 50 to be returned to its initial position by the force of spring 60, disengaging pawl 54 and ratchet wheel 46 and positioning pawl 52 in the path ofthe teeth of ratchet wheel 44. With the beam returned to its initial position, spool 40 again rotates incrementally to feed out a second predetermined section or length of cutting line 20. The cutting line has now been lengthened by the two incremental feedings thereof. The line is trimmed back by the stationary cutting blade 25 mounted on the cutting head housing in the path of the spinning line end to expose a new cutting end.

When replacing spool 40 with a fresh spool of cutting line, it is necessary to permit free rotation of the spool so that the cutting line may be fed manually through hollow shaft 26, the hollow drive shaft of motor 18 and into hollow curved guide tube 22. Motor 18 must also be deenergized during the threading of fresh cutting line for the trimmer.

To provide free rotation of spool 40, pawls 52,54 of beam 50 are simultaneously disengaged from respective ratchet wheel 44, 46. This is accomplished also by the trigger assembly 74. The narrowed end 82 of block 76 extending through block 84 comprises an operating button accessible along the exposed wall 86 of the last mentioned block. Depression of end 82 of block 76 moves block 76 only in the direction of beam 50, bending the beam (FIG. 4a) to cause simultaneous disengagement of both pawls 52, 54 from corresponding ratchet wheels 44, 46, permitting spool 40 to rotate freely. When block 76 is released, beam 50, being resilient, returns to its original position, causing the reengagement of pawl 52 and ratchet wheel 44. Block 76 will also be returned to an extended position shown in FIG. 2.

While a preferred embodiment of the spool feed mechanism 12 has been shown and described wherein the sole movement of spool 40 is rotational and wherein spool 40 includes ratchet wheels having angularly offset teeth sets, it is possible also to mount spool 40 for axial movement with respect to beam 50 and to offset pawls 52, 54, with respect to the axis of rotation of spool 40 while maintaining the teeth sets of ratchet wheels 44, 46, in phase.

It is therefore contemplated to cover by the present application any and all modifications, including those described above, as fall within the true spirit and scope of the appended claims.

We claim:

1. In apparatus for cutting vegetation with the free end of a flexible, non-metallic line played out from a spool, including a rotatably driven cutting head for spinning the free end of the line, a spool feed mechanism mounted on said apparatus for incrementally feeding a predetermined length of line from said spool, said mechanism including in combination; a spool about which said flexible cutting line is wound, said spool being mounted for rotation about the central axis thereof at a position remote from said rotatably driven cutting head and including first and second ends with first and second spool indexing means, respectively, actuating means including first and second engagement means positioned for cooperative engagement with said first and second spool indexing means, respectively, one of said spool and actuating means being mounted for movement relative to the other for alternate engagement of said first spool indexing means and said first engagement means and said second spool indexing means and said second engagement means, respectively, one of said first and second engagement means and said first and second indexing means being displaced with respect to the other of said first and second engagement means and the other of said first and second indexing means, respectively, to provide successive incremental rotation of said spool in response to the alternate engagement of said corresponding engagement means and indexing means whereby successive predetermined lengths of cutting line are fed from said spool, and means for biasing one of said spool and actuating means to a first position whereby said first engagement means and first indexing means are normally engaged.

2. Vegetation cutting apparatus as claimed in claim 1 wherein said first and second indexing means include first and second ratchet wheels, respectively, each having a set of radially extending, circumferentially spaced teeth and wherein said first and second engagement means include first and second pawls, respectively.

3. Vegetation cutting apparatus as claimed in claim 2 wherein said set of teeth of said first ratchet wheel of said spool are displaced angularly about the axis of rotation of said spool from said set of teeth of said second ratchet wheel and wherein said first and second pawls are aligned with respect to the axis of rotation of said spool for engagement of respective ones of said sets of teeth of said ratchet wheels.

4. In apparatus for cutting vegetation with the free end of a flexible, non-metallic line played out from a spool, including a rotatably driven cutting head for spinning the free end of the line, a spool feed mechanism mounted on said apparatus for incrementally feeding a predetermined length of line from said spool, said mechanism comprising:

a spool about which said flexible cutting line is wound, said spool being mounted for rotation about the central axis thereof and including first and second ends with first and second ratchet wheels, respectively, each having a set of radially extending, circumferentially spaced teeth;

actuating means including first and second pawls positioned for cooperative engagement with said first and second ratchet wheels, respectively, one of said ratchet wheels and pawls being mounted for movement relative to the other for alternative engagement of said first ratchet wheel and said first pawl and said second ratchet wheel and said second pawl, respectively, one of said first and second pawls and said first and second ratchet wheels being displaced with respect to the other of said first and second pawls and the other of said first and second ratchet wheels, respectively, to provide successive incremental rotation of said spool in response to the alternate engagement of said corresponding pawls and ratchet wheels whereby successive predetermined lengths of cutting line are fed from said spool, a resilient, generally U-shaped member, each of the legs of the U including one of said first and second pawls, respectively, said resilient member being mounted with the bight thereof in parallel alignment with the axis of rotation of said spool, said pawls being positioned for engagement with respective ones of said ratchet wheels, and further including manually operated trigger means engageable with the bight of said member for bending said member and simultaneously disengaging both said pawls from respective ones of said ratchet wheels, whereby said spool is permitted to rotate freely; and means for biasing one of said ratchet wheels and pawls to a first position whereby said first pawl and first ratchet wheel are normally engaged.

5. Vegetation cutting apparatus as claimed in claim 4 wherein said manually operated trigger means is coupled to said U-shaped member, wherein movement of said manually operated trigger means in a first direction disengages said first pawl and ratchet wheel and engages said second pawl and ratchet wheel, thereby permitting said spool to be rotated a first incremental amount, said biasing means returning said member and said manually operated trigger means to re-engage said first pawl and ratchet wheel and to disengage said second pawl and ratchet wheel, whereby said spool is permitted to be rotated a second incremental amount.

6. Apparatus for cutting vegetation with the free end of a flexible, non-metallic line played out from the spool, including in combination:

a cutting head including rotatably mounted means for spinning the free end of said line;

a handle including means operably coupled to said cutting head for controlling the rotation of said rotatably mounted means;

an elongated, hollow support shaft joining said cutting head and said handle, said shaft defining an aperture providing communication with the interior of said shaft; and a spool feed mechanism for feeding flexible cutting through said shaft to said cutting head, said spool feed mechanism comprising a housing mounted on said support shaft near said handle, said housing defining a compartment therein located adjacent said aperture in said hollow support shaft, a spool about which said cutting line is wound, mounted in said compartment for rotation about the central axis thereof to feed cutting line from said spool into said aperture, through said support shaft to said cutting head, said spool having first and second ends including first and second spool indexing means, respectively, actuating means including first and second engagement means, mounted in said housing for cooperative engagement with said first and second spool indexing means, said actuating means being mounted for movement relative to said spool between first and second positions for alternate engagement of said first spool indexing means and said first engagement means and said second spool indexing means and second engagement means, respectively, whereby successive, predetermined, incremental rotation of said spool is permitted, thereby to feed successive predetermined lengths of cutting line to said cutting head, resilient biasing means coupled to said actuating means for biasing said actuating means to said first postion and manually operated trigger means coupled to said actuating means for moving said actuating means from said first to said second position.

7. Vegetation cutting apparatus as claimed in claim 6 wherein said first and second indexing means include first and second ratchet wheels, respectively, each said wheel having a set of radially extending, circumferentially spaced teeth, wherein said actuating means includes a resilient, u-shaped member, wherein said first and second engagement means include first and second pawls respectively, extending from opposite legs of said u-shaped member and wherein said manually operated trigger means is mounted for engagement of the bight portion of said resilient u-shaped member upon moving said manually operated trigger means in a predetermined direction, whereby said first and second pawls are both disengaged from respective ratchet wheels to permit said spool to rotate freely.

8. Vegetation cutting apparatus as claimed in claim 7 wherein said set of teeth of said first ratchet wheel is displaced angularly about the axis of rotation of said spool from said set of teeth of said second ratchet wheel and wherein said first and second pawls are aligned with respect to the axis of rotation of said spool for alternate engagement of said sets of teeth of said respective ratchet wheels.

9. Vegetation cutting apparatus as claimed in claim 8 wherein said u-shaped member is mounted adjacent said spool with the bight of said member in generally parallel alignment with the axis of rotation of said spool and wherein said u-shaped member is moveable in a direction parallel to the axis of rotation of said spool for alternate engagement and disengagement of said pawls and ratchet wheels, respectively.

10. Vegetation cutting apparatus as claimed in claim 7 further including spaced support members disposed adjacent said spool and wherein said u-shaped member is mounted on said support members with the bight of said u-shaped member positioned in slidable engagement therewith for alternate engagement and disengagement of said pawls and ratchet wheels, respectively said u-shaped member being bendable on said support members in response to the movement of said manually operated trigger means in said predetermined direction for disengagement of both said pawls and respective ratchet wheels.

* * * * *

UNITED STATES PATENT AND TRADEMARK OFFICE
CERTIFICATE OF CORRECTION

PATENT NO. : 4,285,128
DATED : August 25, 1981
INVENTOR(S) : John W. Schnell, Max K. Haenel It is certified that error appears in the above-identified patent and that said Letters Patent are hereby corrected as shown below:

Col. 2, Line 16 - "aperture in th side wall" should read --- aperture in the side wall ---

Col. 4, Line 6 - "wall of the suport shaft" should read --- wall of the support shaft ---

Col. 5, Line 29 - "in the path ofthe teeth" should read --- in the path of the teeth ---

Col. 7, Line 57 & 58 - "flexible cutting through said" should read --- flexible cutting line through said ---

Col. 8, Line 19 - "said first postion and" should read --- said first position and ---

Signed and Sealed this

Twenty-fourth Day of November 1981

[SEAL]

Attest:

Attesting Officer

GERALD J. MOSSINGHOFF

Commissioner of Patents and Trademarks